United States Patent [19]

Yoshimura

[11] Patent Number: 4,796,963
[45] Date of Patent: Jan. 10, 1989

[54] SCANNING APPARATUS USING A ROTARY POLYGON MIRROR

[75] Inventor: Tsuyoshi Yoshimura, Tokyo, Japan

[73] Assignee: Ricoh Company, Ltd., Tokyo, Japan

[21] Appl. No.: 86,635

[22] Filed: Aug. 18, 1987

[30] Foreign Application Priority Data

Aug. 20, 1986 [JP] Japan .................................. 61-194176
Aug. 20, 1986 [JP] Japan .................................. 61-194175

[51] Int. Cl.$^4$ ............................................. G02B 26/10
[52] U.S. Cl. ..................................... 350/6.8; 350/6.5; 358/206
[58] Field of Search ................. 350/6.5, 6.7, 6.8, 6.91; 358/108, 213.15, 260, 285

[56] References Cited

U.S. PATENT DOCUMENTS

| | | | |
|---|---|---|---|
| 4,130,339 | 12/1978 | Kawamura et al. | 350/6.8 |
| 4,349,843 | 9/1982 | Laakmann et al. | 350/6.8 |
| 4,571,035 | 2/1986 | Sakuma | 350/6.8 |
| 4,712,884 | 12/1987 | Sakuma et al. | 350/6.8 |
| 4,714,960 | 12/1987 | Laakmann | 350/6.8 |

FOREIGN PATENT DOCUMENTS 58-46317  3/1983  Japan .
59-123821  8/1984  Japan .

Primary Examiner—John K. Corbin
Assistant Examiner—Martin Lerner
Attorney, Agent, or Firm—Oblon, Fisher, Spivak, McClelland & Maier

[57] ABSTRACT

A scanning apparatus using a rotary polygon mirror comprises a rotary polygon mirror, a motor for driving the rotary polygon mirror, an optical lens system positioned in front of the rotary polygon mirror for projecting a laser beam onto the rotary polygon mirror and outputting the laser beam reflected thereby toward a photosensitive drum, and a housing for enclosing the rotary polygon mirror in a closed space formed therein and accommodating the optical lens system.

7 Claims, 6 Drawing Sheets

SCANNING APPARATUS USING A ROTARY POLYGON MIRROR

BACKGROUND OF THE INVENTION

The present invention generally relates to a scanning apparatus using a rotary polygon mirror, and in particular to a scanning apparatus using a rotary polygon mirror in use for a laser printing machine, a laser beam scanner or a copying machine.

It is well known that a scanning apparatus using a rotary polygon mirror has widely been applied to many kinds of optical apparatuses. A laser printing machine is one example of such optical apparatuses. The laser printing machine can print information at an extremely high-speed. A scanning apparatus using a rotary polygon mirror used in the laser printing machine deflects a laser beam emitted by an optical source and scans a photosensitive drum to form electrostatic latent images thereon. A conventional scanning apparatus mainly includes a rotary polygon mirror driven by a motor, a laser diode unit consisting of a laser diode and a collimator lens, a cylindrical lens, a transparent plate, and an $f\theta$ lens. The laser diode unit and the cylindrical lens are arranged in an incident optical path of the scanning apparatus, whereas the $f\theta$ lens is arranged in a reflection optical path. The transparent plate is arranged in both the incident and reflection optical paths. A laser beam emitted by the laser diode unit passes through the cylindrical lens and the transparent plate, and is deflected by the rotary polygon mirror. A deflected laser beam passes through the transparent plate and the $f\theta$ lens, and then scans the photosensitive drum, so that electrostatic latent image are formed on the drum.

During the scanning operation, the rotary polygon mirror is rotated by the motor at a high-speed in the range from approximately a few thousand to twenty thousand rotations per minute. The high-speed rotating motion of the rotary polygon mirror causes noise due to the rotary polygon mirror cutting air in its vicinity as well as high frequency sounds generated at a bearing for coupling the rotary polygon mirror with the axis of the motor. Therefore, the rotary polygon mirror of the conventional scanning apparatus is enclosed by a cover specifically designed for the rotary polygon mirror, as will be described later. The rotary polygon mirror enclosed by the cover is mounted on a housing which accommodates an optical lens system composed of the laser diode unit, the cylindrical lens and the $f\theta$ lens.

However, the conventional scanning apparatus using the rotary polygon mirror has the following disadvantages. First, the total cost of the scanning apparatus becomes expensive, because there must be manufactured specifically the cover designed for enclosing the rotary polygon mirror. This also results in an increase in the total number of parts. Further, an additional space for accommodating the cover in the housing is required. Moreover, the operation for positioning the rotary polygon mirror enclosed by the cover with respect to the optical lens system is very complicated.

Secondly, flare light due to an undesirable reflection of the laser beam by the transparent plate forms noises on the images on the drum.

SUMMARY OF THE INVENTION

Accordingly, it is a general object of the present invention to provide a novel and useful scanning apparatus using a rotary polygon mirror, in which the above problems have been eliminated.

Another and more specific object of the present invention is to provide a scanning apparatus using a rotary polygon mirror comprising a rotary polygon mirror; a motor for driving the rotary polygon mirror; an optical lens system positioned in front of the rotary polygon mirror for projecting a laser beam onto the rotary polygon mirror and outputting the laser beam reflected thereby toward a photosensitive drum; and a housing for enclosing the rotary polygon mirror in a closed space formed therein and accommodating the optical lens system.

Other objects and further features of the present invention will be apparent from the following detailed description when read in conjunction with the attached drawings.

DETAILED DESCRIPTION

Figure 1B:
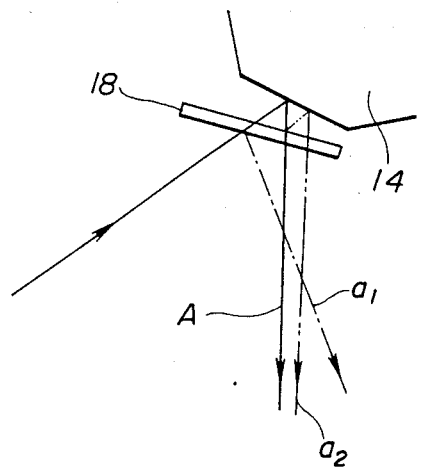
FIG. 1B is an enlarged plan view showing behavior of an incident laser beam projected onto one mirror surface of the rotary polygon mirror through a transparent plate.
Figure 1A:
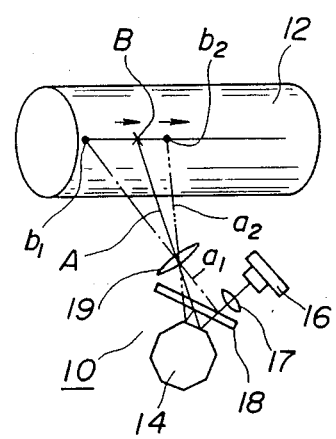
FIG. 1A is a diagrammatic perspective view of a laser beam printing machine with a conventional scanning apparatus using a rotary polygon mirror.

Description will now be given with respect to a conventional scanning apparatus using a rotary polygon mirror with reference to FIGS. 1A, 1B and 2 in order to ensure a better understanding of the present invention.

A laser printing machine illustrated has a scanning apparatus 10 using a rotary polygon mirror, and a photosensitive drum 12. The scanning apparatus 10 has a rotary polygon mirror 14 having a plurality of mirror surfaces provided on a peripheral surface of a body. The rotary polygon mirror 14 illustrated FIG. 1A has eight mirror surfaces. In an incident optical path extending toward the rotary polygon mirror 14 which is driven by a motor (not shown in FIGS. 1A and 1B), there is provided a laser diode unit 16 consisting of a laser diode and a collimator lens, a cylindrical lens 17 and a transparent plate 18 made of glass, for example. In a reflection optical path extending from the rotary polygon mirror 14 to the drum 12, there is provided the transparent plate 18 and $f\theta$ lens 19. A laser beam emitted by the laser diode unit 16 passes through the cylindrical lens 17 and the transparent plate 18, and is then deflected on one mirror surface of the rotary polygon mirror 14. A deflected laser beam passes through the transparent plate 18 and the fθ lens 19, and then scans the drum 12. In the FIG. A, a main scanning direction is indicated with arrows.

Figure 2:
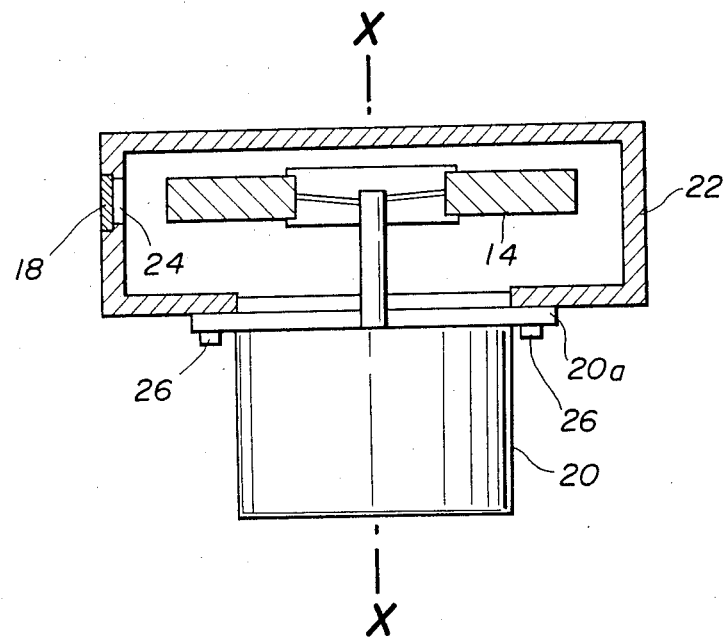
FIG. 2 is a sectional view of a conventional rotary polygon mirror enclosed by a cover specifically designed for enclosing the rotary polygon mirror.

The rotary polygon mirror 14 is enclosed by a cover, as shown in FIG. 2. The illustrated configuration is disclosed in the Japanese Patent Laid-Open Publication No. 166,615/1980, for example. The rotary polygon mirror 14 is tightly enclosed by a cover 22 specifically designed for the rotary polygon mirror 14, in order to reduce undesirable sounds due to the high speed rotating motion of the rotary polygon mirror 14. The cover 22 is mounted on a flange 20a of a motor 20 driving the rotary polygon mirror 14 by means of screws 26. In a side wall of the cover 22, there is formed a cutout window 24, into which the transparent plate 18 is fitted. It should be noted that the transparent plate 18 is arranged in a direction parallel to the axial direction X—X of the rotary polygon mirror 14. The rotary polygon mirror 14 enclosed by the cover 22 is mounted on a housing (not shown) which accommodates an optical lens system composed of the laser diode unit 16, the cylindrical lens 17 and the fθ lens 19.

However, the conventional scanning apparatus using the rotary polygon mirror aforementioned has the following disadvantages.

(i) The total cost of the scanning apparatus 10 using the rotary polygon mirror 14 becomes expensive, because the cover 22 specifically designed for enclosing the rotary polygon mirror 14 must be prepared. This also results in an increase in the total number of parts. Further, an additional space for accommodating the cover 22 is required in the housing. Moreover, the operation for positioning the rotary polygon mirror 14 enclosed by the cover 22 with respect to the optical lens system supported on the housing is very complicated. This is because it is necessary to mount the assembly shown in FIG. 2 on the housing in such a manner that the transparent plate 18 accurately faces the incident optical path and the reflection optical path.

(ii) In the scanning operation, most of the incident laser beam emitted by the laser diode unit 16 passes through the transparent plate 18. This laser beam, or a main laser beam A is reflected on one mirror surface of the rotary polygon mirror 14 and forms an electrostatic latent image B on the photosensitive drum 12, as shown in FIGS. 1A and 1B. However, part of the incident laser beam is reflected on the front surface or the back surface of the transparent plate 18, and forms noises on the images on the drum 12. In detail, part of the incident laser beam is reflected on the front surface of the transparent mirror 18. A reflected laser beam $a_1$ continues to be projected onto a constant position $b_1$ on the drum 12 during scanning of one line. On the other hand, another part of the main laser beam, or a laser beam $a_2$ passes through the transparent plate 18 and is reflected on the rotary polygon mirror 14. The laser beam $a_2$ is reflected on the back surface of the transparent plate 18 again and goes toward the rotary polygon mirror 14 again. The laser beam $a_2$ is reflected again on the same mirror surface and passes through the transparent plate 18, and is finally projected onto a position $b_2$ on the drum 12. The position $b_2$ moves together with the images B in a main scanning direction or an axial direction of the drum 12. The images formed at the positions $b_1$ and $b_2$ are recorded on the drum 12 as the noises on the images. In order to prevent the incident laser beam from being reflected on the surfaces of the transparent plate 18, the surfaces are coated with anti-reflection coating material. However, it is impossible to totally prevent the generation of the laser beams $a_1$ and $a_2$, or the flare light. This means that the noises on the images remain on the drum 12.

The present invention intends to eliminate the above problems in the conventional scanning apparatus using the rotary polygon mirror.

Description will now be given of an embodiment of a scanning apparatus using a rotary polygon mirror according to the present invention, with reference to FIGS. 3 and 4.

In these figures, a housing 30 forms an incident optical path 32, a reflection optical path 34 and a hollow cylindrical part 36. The housing 30 has a wall 38 formed on a periphery of the housing 30 except a peripheral region where a beam outlet 34a of the reflection optical path 34 is formed. The incident optical path 32 and the reflection optical path 34 are mutually separated by a projection 40. The housing 30 is preferably made of heat resistant materials. For example, the housing 30 may be integrally formed with unsaturated polyester resin. On a part of the wall 30 which faces the incident optical path 32, there is attached a laser diode unit 42 consisting of a laser diode and a collimator lens. The laser diode unit 42 emits a parallel laser beam into the incident optical path 32. In the incident optical path 32, there is provided a cylindrical lens 44, which is fixed to the housing 30 with an adhesive. The cylindrical lens 44 may be made of glass or plastic. In the reflection optical path 34, there is provided an fθ lens 46 composed of two lenses. These lenses are also fixed to the housing 30 with an adhesive. The fθ lens 46 converts the constant velocity rotating motion of the laser beam into the constant velocity linear motion. The fθ lens 46 may be made of glass or plastic.

The hollow cylindrical part 36 of the housing 30 has a lower inner peripheral surface 36a and an upper inner peripheral surface 36b. The diameter of the lower peripheral surface 36a is smaller than that of the latter. The hollow cylindrical part 36 has a cutout opening 48 facing the incident and reflection optical paths 32 and 34. A transparent plate 50 such as a glass plate is fitted into the opening 48 and is fixed thereto with an adhesive. Opposing edges of the hollow cylindrical part 36 are formed in the substantially V-shaped configuration for holding the transparent plate 50. The transparent plate 50 constitutes one of the members for forming an enclosed space within which a rotary polygon mirror 52 is held. Also, as will be described in detail later, the transparent plate 50 is inclined by a predetermined angle θ with respect to the axial direction X—X of the rotary polygon mirror 52.

The rotary polygon mirror 52 is attached to an axis of a motor 54. The rotary polygon mirror 52 may be made of glass or aluminum. A casing 56 of the motor 54 has a cylindrical part 56a formed at an upper part of the casing 56. The diameter of the cylindrical part 56a is substantially equal to that of the lower peripheral surface 36a formed in the housing 30. The casing 56 further has a flange 58 formed at the lower side of the cylindrical part 56a. The flange 58 has through holes 58a through which screws 60 pass. The rotary polygon mirror 52 fixed to the axis of the motor 54 is inserted into the hollow cylindrical part 36 through a lower opening thereof. The cylindrical part 56a of the casing 56 is tightly fitted into the lower peripheral surface 36a, because their diameters are substantially equal. The flange 58 of the casing 56 is secured to a lower edge surface of the hollow cylindrical part 36 by the screws 60. In this state, the rotary polygon mirror 52 is substantially positioned at the same level as an optical lens system consisting of the laser diode unit 42, the cylindrical lens 44 and the fθ lens 46. It should be appreciated that the assembly operation of the rotary polygon mirror 52 to the housing 30 can be facilitated, in contrast with that of the conventional configuration, because according to the configuration in FIG. 3, it is not required to consider the position of the transparent plate with respect to the optical lens system.

On an upper edge surface of the hollow cylindrical part 36, there is mounted a sound insulating plate 62 of a substantially disc-shaped configuration. The sound insulating plate 62 is secured to the upper edge surface by screws 64. The sound insulating plate 62 has a projection 62a extending downwards from the surface thereof. The projection 62a makes contact with and supports the transparent plate 50 fitted into the opening 48 formed in the hollow cylindrical part 36. Plastic resin is an appropriate material for the sound insulating plate 62. On an upper edge surface of the housing 30, there is mounted a housing cover 66 for covering the whole of the housing 30. The housing cover 66 is fixed to the housing 30 by screws 68.

As described in the foregoing, the hollow cylindrical part 36 for accommodating the rotary polygon mirror 52 is formed in the housing 30 which supports the optical lens system composed of the laser diode unit 42, the cylindrical lens 44 and the fθ lens 46. The rotary polygon mirror 52 is accommodated in the housing 30 in a state such that the cylindrical part 56a of the casing 56 of the motor 54 is tightly fitted into the lower peripheral surface 36a of the hollow cylindrical part 36. The upper opening of the hollow cylindrical part 36 is perfectly covered by the sound insulating plate 62. Further, the opening 48 is sealed by the transparent plate 50. Therefore, the rotary polygon mirror 52 is positioned in a tightly enclosed space and is thus configured without using the specifically designed case used in the conventional scanning apparatus. In addition, the housing 30 is covered by the housing cover 66. Hence, the sound insulating effect of the embodiment is enhanced, as compared with the conventional configuration illustrated in FIG. 2.

Figure 4:
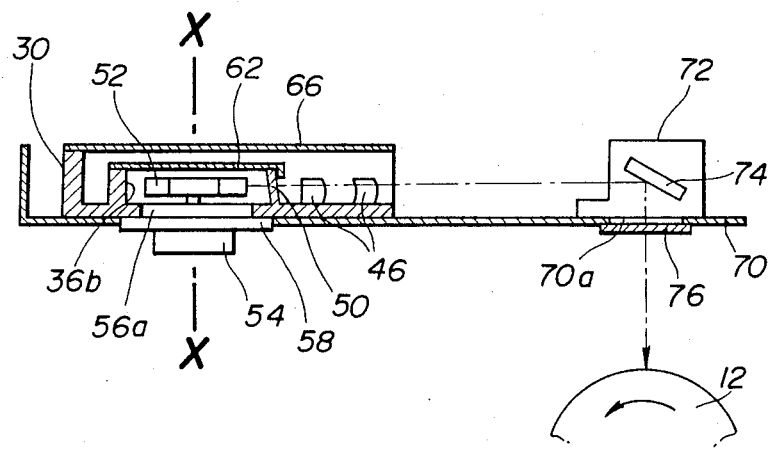
FIG. 4 is a sectional view of the scanning apparatus in FIG. 3, in which the scanning apparatus is mounted on a base of a laser printing machine.

The scanning apparatus aforementioned are mounted on a base 70 of a laser printing machine, for example, as shown in FIG. 4. On the base 70, there is provided a mirror 74 supported by a frame 72. The mirror 74 acts to vary the direction of the reflection optical path extending from the rotary polygon mirror 52. A cutout window 70a is formed in the base 70 under the mirror 74 and is sealed by a glass plate 76 for dust protection. The configuration illustrated in FIG. 4 can be adapted to an optical system of a relatively large size built into a laser printing machine or a laser beam scanner. For example, this configuration is appropriate to a laser printing machine in which the distance between the fθ lens 46 and the mirror 74 for varying the reflection optical path is considerably long.

Figure 3:
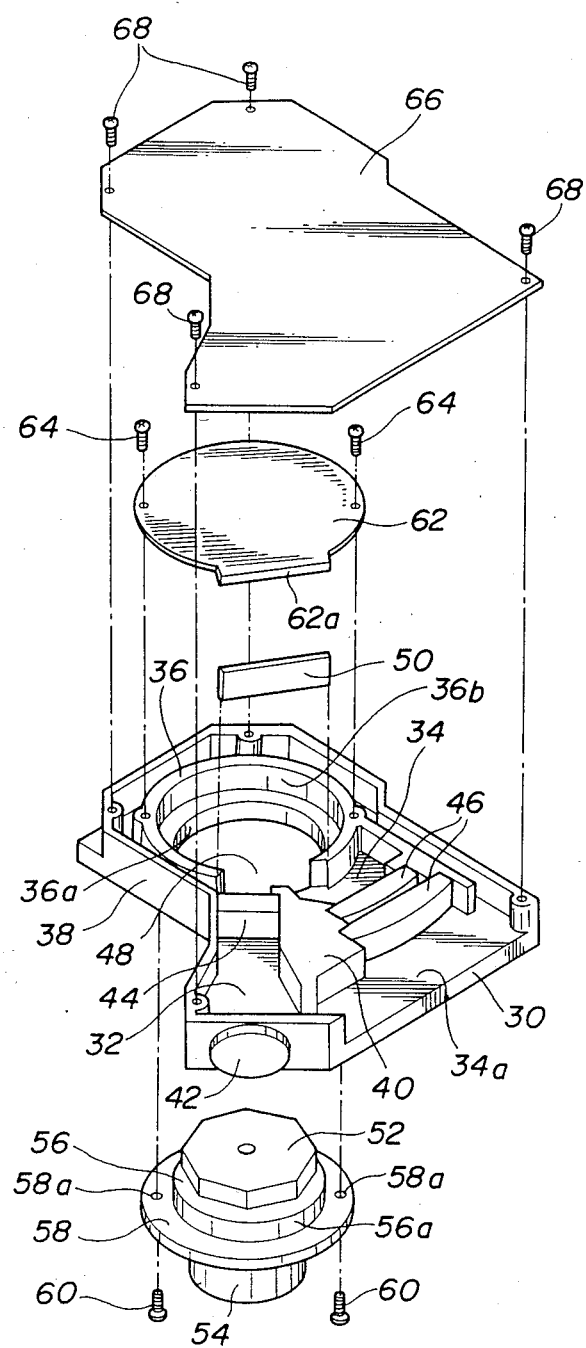
FIG. 3 is a disassembled perspective view of an embodiment of a scanning apparatus using a rotary polygon mirror according to the present invention.

When operating of the laser printing machine shown in FIG. 4 which employs the scanning apparatus FIG. 3 according to the present invention, the laser diode unit 42 emits a parallel laser beam which is on/off-controlled in response to an picture signal which is provided for example by a signal processing circuit. The laser beam is compressed in a sub-scanning direction corresponding to the rotating direction of the drum 12, and then passes through the transparent plate 50. The laser beam from the transparent plate 50 is deflected by a mirror surface of the rotary polygon mirror 52 driven by the motor 54, and passes through the transparent plate 50 again. Then, the laser beam passes through the fθ lens 46 and is reflected by the mirror 74. The laser beam from the mirror 74 forms electrostatic latent images on the drum 12 with a constant velocity scanning. The images are an aggregation of dots. In the printing operation mentioned above, uncomfortable sounds are effectively insulated.

Figure 5:
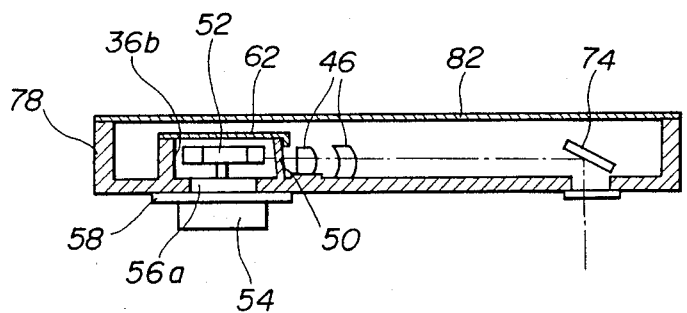
FIG. 5 is a sectional view of a variation of the scanning apparatus in FIGS. 3 and 4.

FIG. 5 illustrates a variation of the scanning apparatus in FIGS. 3 and 4, in which the same elements as those in the previous figures are denoted by the same reference numerals as those therein. One of the essential features of the configuration in FIG. 5 is that the mirror 74 for varying the reflection optical path extending from the rotary polygon mirror 52 is provided within a housing 78 which is covered by a housing cover 82. This configuration can be adapted to an optical system of a relatively small size built into the laser printing machine or the laser beam scanner. Of course, this configuration has the features provided by the configuration in FIGS. 3 and 4.

Figure 6:
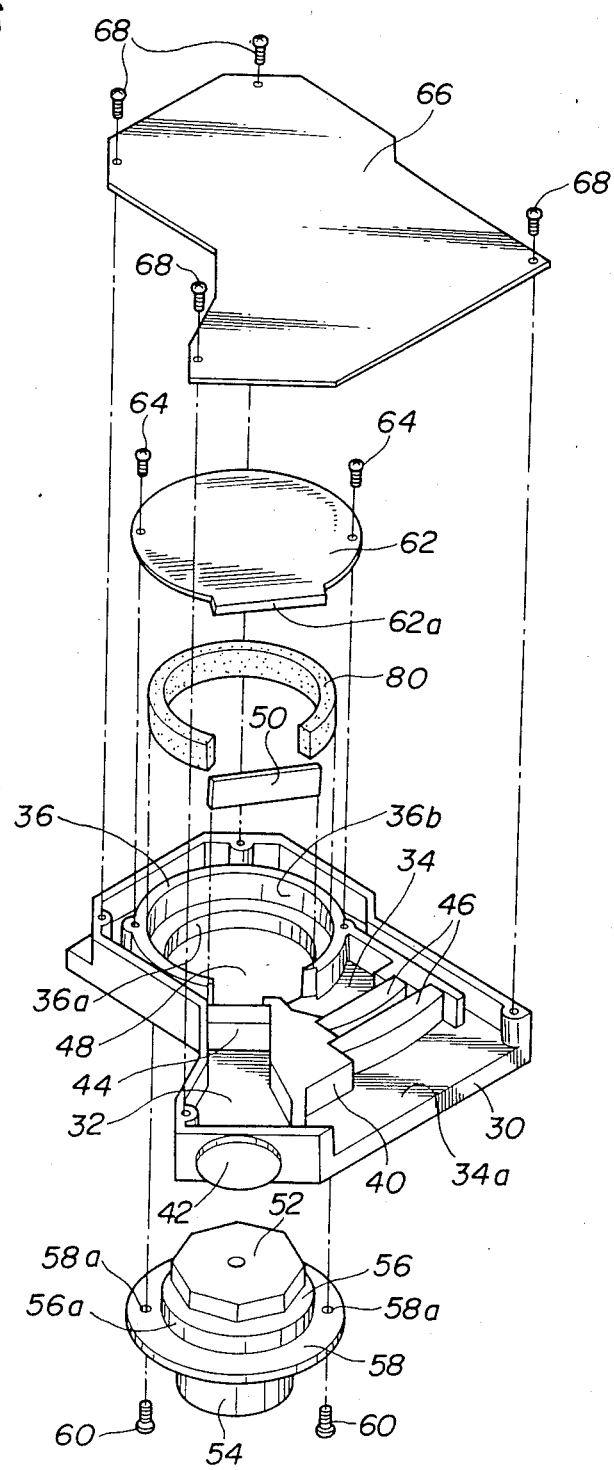
FIG. 6 is a disassembled perspective view of a modification of the scanning apparatus in FIGS. 3 and 4.

FIG. 6 illustrates a modification of the scanning apparatus in FIGS. 3 and 4, in which the same elements as those in the previous figures are denoted by the same reference numerals as those therein. One of the essential features of the modification is that a vibration absorbing member 80 of a substantially C-shaped cross section is mounted on the upper peripheral surface 36b of the hollow cylindrical part 36. The vibration absorbing member 80 may be made of glass fiber or felt.

Description will be given of the action of the vibration absorbing member 80 with reference to FIGS. 7A, 7B and 7C.

Figure 7A:
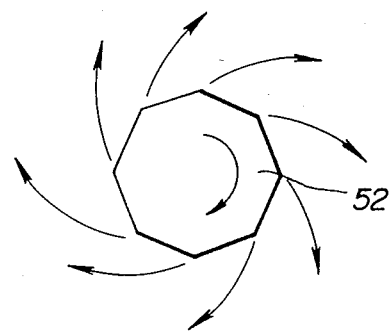
FIGS. 7A through 7C are respectively plan views showing the flow of air due to the rotation of the rotary polygon mirror.
Figure 7B:
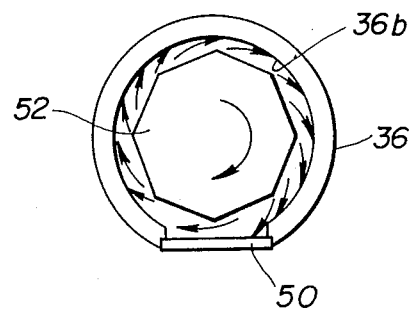
Figure 7C:
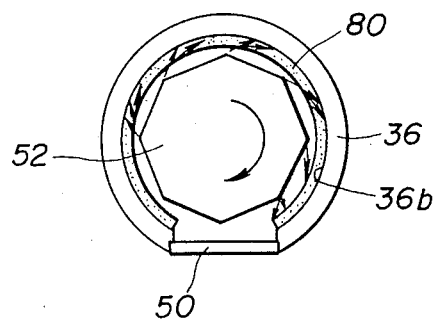

The rotary polygon mirror 52 upon the rotating operation blows out the air in its vicinity, as shown with arrows in FIG. 7A. If the rotary polygon mirror 52 is not sealed, the air blown out by the rotary polygon mirror 52 hits several parts of the housing. This causes the vibration of the housing and the rotary polygon mirror 52 itself, and also increases noise. On the other hand, when the rotary polygon mirror 52 is tightly enclosed as shown in FIG. 7B, the air pushed out by the rotary polygon mirror 52 hits the peripheral surface 36b of the hollow cylindrical part 36. Then, the air rotates along the peripheral surface 36b and exerts the wind pressure thereon. The flow of the air acts to vibrate the housing 30. The vibration absorbing member 80 absorbs the flow of the air and diffuses the wind pressure exerted on the peripheral surface 36b. It is therefore possible to suppress the wind pressure and simultaneously reduce the undesirable sounds due to the rotation of the rotary polygon mirror 52.

Figure 8B:
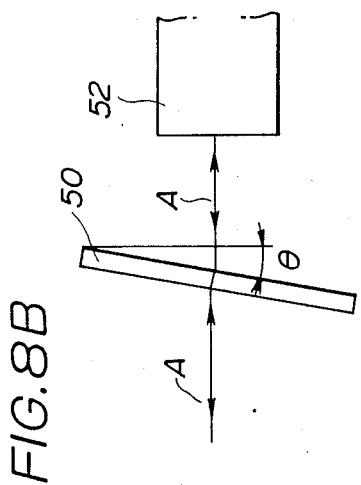
FIGS. 8A through 8D are respectively views showing behavior of an incident laser beam projected onto one mirror surface of the rotary polygon mirror through a transparent plate employed in the present invention.
Figure 8D:
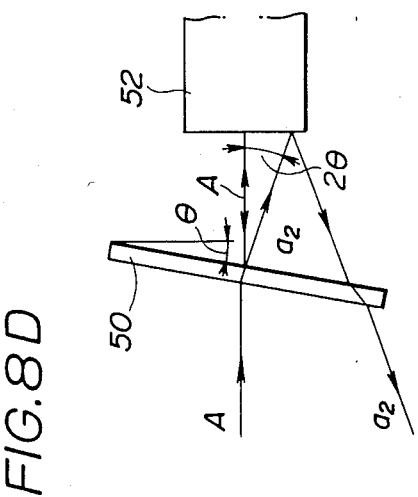
Figure 8A:
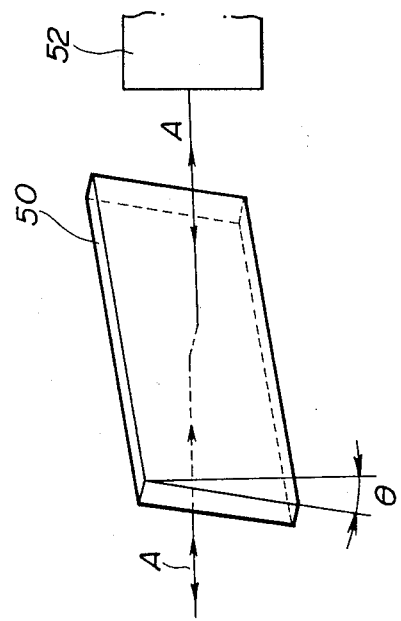
Figure 8C:
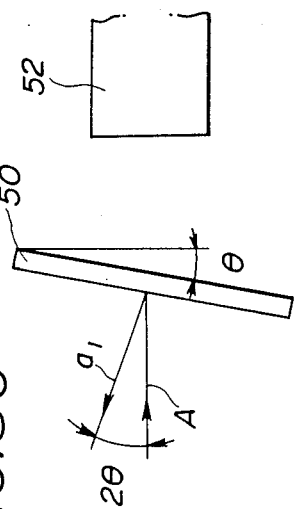

Description will now be given of an effect of the transparent plate 50. As described in the foregoing, the transparent plate 50 is attached to the opening 48 of the cylindrical part 36 so as to be inclined by a predetermined angle θ with the respect to the axial direction X—X of the rotary polygon mirror 52, in order to eliminate the noises formed on the images resulting from the undesirable reflection of the laser beam caused by the transparent plate 50. FIGS. 8A through 8D show the action of the transparent plate 50. When the transparent plate 50 is inclined by a predetermined angle $\theta$ with respect to the axial direction of the rotary polygon mirror 52, most of the incident laser beam emitted by the laser diode unit 42 is refracted at a border between the air and the front surface of the transparent plate 50 and enters therein, as shown in FIGS. 8A and 8B. Then the main laser beam A is refracted again at a border between the back surface of the transparent plate 50 and the air, and is projected perpendicularly onto the mirror surface of the rotary polygon mirror 52, as shown in FIGS. 8A and 8B. The laser beam A reflected by the rotary polygon mirror 52 passes through the transparent plate 50 again and goes toward the drum 12. In this case, the laser beam going toward the drum 12 has the same propagating surface as that of the incident laser beam, as shown in FIGS. 8A and 8B. On the other hand, part of the incident laser beam or the laser beam $a_1$ is reflected on the front surface of the transparent plate 50 in the direction of the angle $2\theta$ with respect to the incident laser beam, as shown in FIG. 8C. Therefore, the propagating surface of the laser beam $a_1$ is different from that of the incident laser beam. Further, as shown in FIG. 8D, part of the incident laser beam or the laser beam $a_2$ is reflected on the back surface of the transparent plate 50 in the direction of the angle $2\theta$ with respect to the main laser beam A. The laser beam $a_2$ is reflected again by the rotary polygon mirror 52 and then passes through the transparent plate 50. The propagating surface of the laser beam $a_2$ is distinct from that of the incident laser beam. The amount of the angle $\theta$ is determined so that the laser beams $a_1$ and $a_2$ pass by the $f\theta$ lens 46 and therefore does not enter therein. Consequently, the laser beams $a_1$ and $a_2$ does not reach to the drum 12 and no noise on the images is formed on the drum 12. Although the transparent plate 50 is inclined downward by the angle $\theta$ in the configuration aforementioned, it is also possible to incline the transparent plate 50 upward by the angle $\theta$.

The present invention is not limited to the embodiments, but various variation and modification may be made without departing from the scope of the invention. For example, the number of the mirror surface of the rotary polygon mirror 52 is not limited to eight. Also, the $f\theta$ lens 46 is not limited to the combination of two lenses, and may be formed by the combination of three or more lenses, or only one lens. In addition, it is possible to omit the $f\theta$ lens 46 by providing the mirror surfaces of the rotary polygon mirror 52 with an process for correcting the optical deformation.

What is claimed is:

1. A scanning apparatus using a rotary polygon mirror comprising:
    a housing including a hollow cylindrical part having a cutout opening;
    a rotary polygon mirror being supported by a cylindrical member and being accommodated within said hollow cylindrical part in a state where said cylindrical member is tightly fitted into said hollow cylindrical part;
    a motor for driving said rotary polygon mirror;
    a noise insulating member mounted on an upper edge surface of said hollow cylindrical part;
    an optical lens system accommodated in said housing and arranged in front of said rotary polygon mirror, said optical lens system projecting a laser beam onto said rotary polygon mirror and outputting said laser beam reflected thereby toward a photosensitive drum;
    a transparent plate member being fitted into said cutout opening; and
    a vibration absorbing member which is attached on an inner wall of said hollow cylindrical part.

2. A scanning apparatus using a rotary polygon mirror as claimed in claim 1, wherein said cylindrical member tightly fitted into said hollow cylindrical part is a part of a casing of said motor.

3. A scanning apparatus using a rotary polygon mirror as claimed in claim 1, wherein said optical lens system comprises a laser diode unit consisting of a laser diode and a collimator lens, a cylindrical lens positioned between said laser diode unit and said transparent member, and a $f\theta$ lens positioned in a reflection optical path of said laser beam reflected by said rotary polygon mirror.

4. A scanning apparatus using a rotary polygon mirror as claimed in claim 3, wherein said optical lens system further comprises a lens for varying said reflection optical path.

5. A scanning apparatus using a rotary polygon mirror as claimed in claim 1, wherein said hollow cylindrical part, said cylindrical member, said noise insulating member and said transparent plate member form a tightly closed spacing into which said polygon mirror is positioned.

6. A scanning apparatus using a rotary polygon mirror as claimed in claim 1, wherein said transparent plate member is a transparent parallel plate, and the laser beam which is projected onto and is then reflected onto said rotary polygon mirror passes through said transparent parallel plate.

7. A scanning apparatus using a rotary polygon mirror comprising:
    a housing including a hollow cylindrical part having a cutout opening;
    a rotary polygon mirror being supported by a cylindrical member and being accommodated within said hollow cylindrical part in a state where said cylindrical member is tightly fitted into said hollow cylindrical part;
    a motor for driving said rotary polygon mirror;
    a noise insulating member mounted on an upper edge surface of said hollow cylindrical part;
    an optical lens system accommodated in said housing and arranged in front of said rotary polygon mirror, said optical lens system projecting a laser beam onto said rotary polygon mirror and outputting said laser beam reflected thereby toward a photosensitive drum; and
    a transparent plate member being fitted into said cutout opening,
    said transparent plate member is inclined by a predetermined inclination angle with respect to an axis of said rotary polygon mirror effective to substantially eliminate noise due to undesirable reflected light.

* * * * *